(12) United States Patent
Bliss

(10) Patent No.: US 6,408,865 B1
(45) Date of Patent: Jun. 25, 2002

(54) MULTI-SEASONAL DISPOSABLE HUNTING BLIND

(76) Inventor: Ronnie W. Bliss, 2900 E. 6th #105, Stillwater, OK (US) 74074

( * ) Notice: Subject to any disclaimer, the term of this patent is extended or adjusted under 35 U.S.C. 154(b) by 0 days.

(21) Appl. No.: 09/659,910

(22) Filed: Sep. 12, 2000

Related U.S. Application Data

(60) Provisional application No. 60/156,389, filed on Sep. 28, 1999.

(51) Int. Cl.$^7$ .............................................. E04H 15/62
(52) U.S. Cl. ........................... 135/118; 135/96; 135/66; 135/74; 135/901; 135/117; 135/126; 135/132; 43/1
(58) Field of Search ............................. 135/118, 96, 66, 135/74, 901, 117, 126, 132; 43/1

(56) References Cited

U.S. PATENT DOCUMENTS

| | | | |
|---|---|---|---|
| 2,837,777 A | 6/1958 | White ............................. 20/2 |
| 3,709,237 A | * 1/1973 | Smith ......................... 135/1 R |
| 4,064,662 A | 12/1977 | O'Toole ......................... 52/71 |
| 4,123,869 A | 11/1978 | Witt ................................ 43/1 |
| RE30,605 E | 5/1981 | Witt ................................ 43/1 |
| 4,295,446 A | 10/1981 | Voss ............................. 119/19 |
| 5,062,234 A | * 11/1991 | Green ............................. 43/1 |
| 5,345,961 A | * 9/1994 | Yercha et al. ................. 425/87 |
| 5,609,176 A | * 3/1997 | Weeks .......................... 135/96 |
| 5,669,403 A | 9/1997 | Belcher et al. ............... 135/90 |
| 5,842,630 A | 12/1998 | Remer ......................... 229/116 |
| 5,944,041 A | 8/1999 | Kitchens ..................... 135/901 |
| 6,164,005 A | * 12/2000 | Copeland ......................... 43/1 |

* cited by examiner

Primary Examiner—Carl D. Friedman
Assistant Examiner—Chi Q. Nguyen
(74) Attorney, Agent, or Firm—Head, Johnson & Kachigan

(57) ABSTRACT

A hunting blind formed of a flat base panel having opposed first and second creases forming a first side panel and a second side panel, each of the side panels being foldable to first positions to lie parallel to the base panel or to second positions to extend at angles to the base panel, opposed surfaces of the panels having a camouflaged pattern thereon.

5 Claims, 2 Drawing Sheets

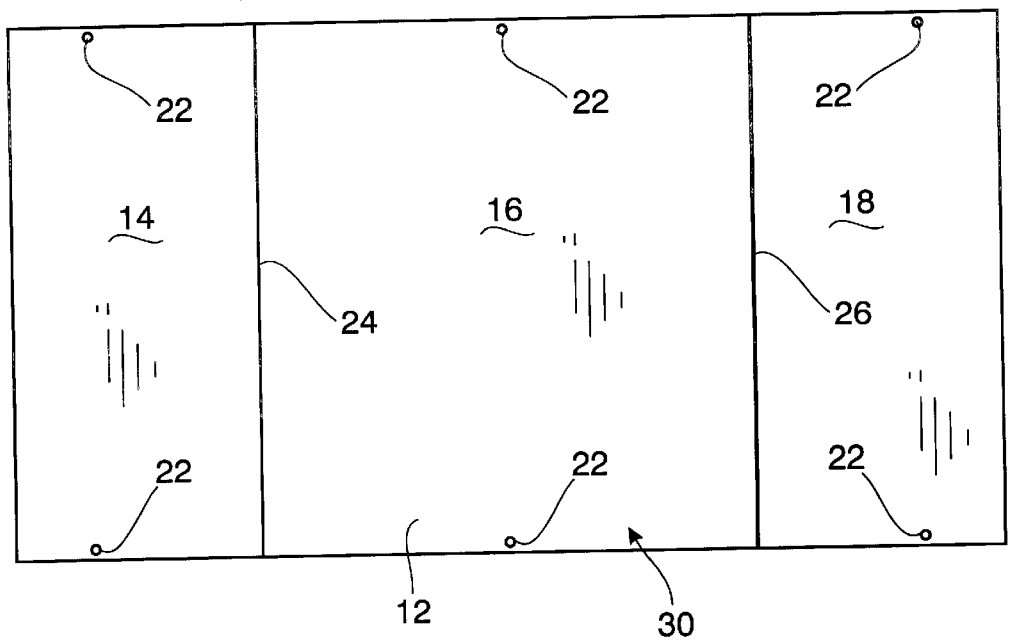
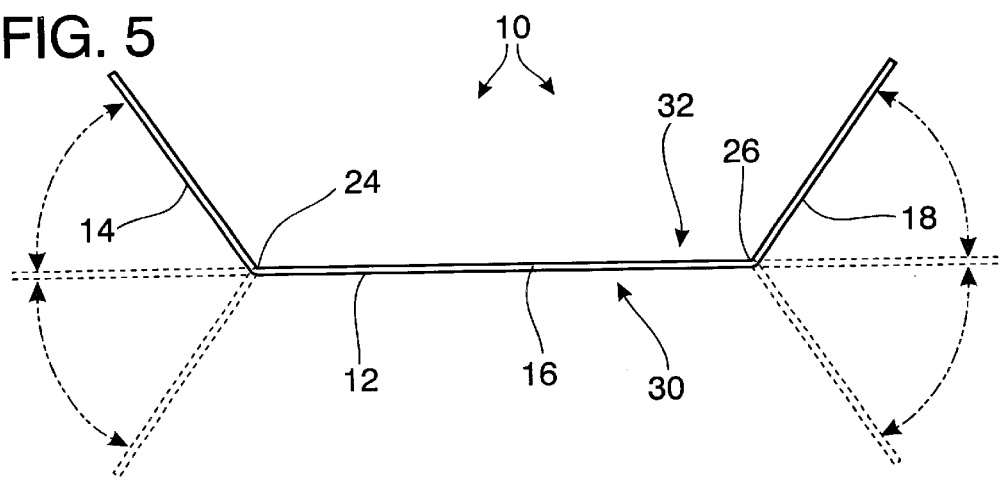
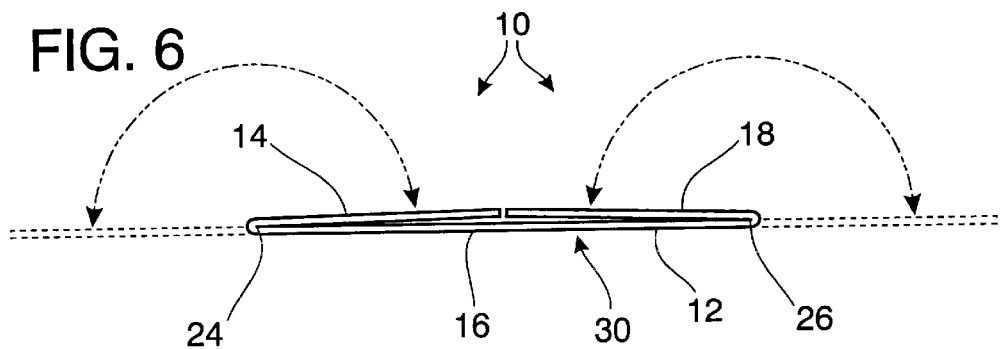

MULTI-SEASONAL DISPOSABLE HUNTING BLIND

REFERENCE TO PENDING APPLICATIONS

This application is based on U.S. Provisional Patent Application Ser. No. 60/156,389 entitled, "MULTI-SEASONED DISPOSABLE HUNTING BLIND" that was filed on Sep. 28, 1999.

REFERENCE TO MICROFICHE APPENDIX

This application is not referenced to a Microfiche Appendix.

BACKGROUND OF THE INVENTION

The present invention relates generally to hunting blinds. More specifically the present invention relates to a multi-seasonal camouflaged disposable hunting blind.

A hunting blind is a structure which a person can hide in or behind in order to obstruct his or her movement from wild game yet be able to observe and fire upon said game. Stationary blinds are usually constructed from or covered with natural materials, such as branches or reeds to blend into the surrounding environment or are covered with a camouflaged pattern and coloration to blend into a particular background environment, such as various woodlands, prairies, brush, swamp and/or deserts. Portable blinds are generally constructed of a lightweight frame with fabric or screen materials secured to the frame. This material typically has a camouflaged pattern printed thereon.

The examples of portable hunting blinds are shown in U.S. Pat. No. 5,669,403 issued to Belcher et al. on Sep. 23, 1997 and U.S. Pat. No. 5,944,041 issued to Kitchens on Aug. 31, 1999. These blinds include a frame with a camouflaged material attached thereto.

| PATENT NO. | INVENTOR | TITLE |
| --- | --- | --- |
| RE 30,605 of 4,123,869 | Witt | Goose and Duck Blind |
| 2,837,777 | White | Collapsible Shelter |
| 4,064,662 | O'Toole | Collapsible Tetrahedral Structure |
| 4,123,869 | Witt | Goose and Duck Blind |
| 4,295,446 | Voss | Collapsible Shelter |
| 5,669,403 | Belcher et al. | Hunting Blind |
| 5,842,630 | Remer | Structure Formed of a Single Sheet of Foldable Material for Containing Three Dimensional Objects |
| 5,944,041 | Kitchens | Portable Blind |

The prior art of portable blinds contain disadvantages, however, in order to create such a portable blind the camouflaged material must be secured to the frame in such a manner as to obstruct or mask the movement of the hunter or outdoors man. Further, these devices are meant for multiple excursion into the outdoors. In the event the frame and/or camouflaged material is damaged, the portable blind would be rendered ineffective and costly to the hunter by way of replacement. Thus there is a need for a portable blind that is disposable in the event of damage.

Another disadvantage of the present portable blind is that the camouflaged pattern associated with the frame material is directed toward a single pattern for a single environment or season. This causes the hunter or outdoors man to acquire environmental and seasonal specific frame material. Thus there is a need for a portable blind which can be utilized in multiple seasons and/or environments.

Therefore it is an object of the present invention to provide a portable hunting blind that has the ability to be utilized in multiple seasons and/or environments.

Another object of the present invention is to provide a portable hunting blind that is disposable.

Another object of the present invention is to provide a portable hunting blind made from biodegradable material.

BRIEF SUMMARY OF THE INVENTION

The present invention is directed toward a portable hunting blind which can be disposable made of a biodegradable material and utilized in multiple environments and/or seasons. Specifically, the present invention is directed toward a hunting blind made of a lightweight biodegradable material, such as cardboard, having a first and second side, each side contains different camouflaged patterns associated therewith. Each camouflaged pattern can simulate different environment surroundings and/or different seasons.

The blind is constructed of a lightweight biodegradable material, such as cardboard. By utilizing this material, the hunting blind of the present invention is lightweight and disposable in the event of damage to the blind. Further, should the blind break apart in the outdoors, the biodegradable nature of the material would not harm the environment.

Other objects and further scope of the applicability of the present invention will become apparent from the detailed description to follow, taken in conjunction with the accompanying drawings wherein like parts are designated by like reference numerals.

DESCRIPTION OF THE DRAWINGS

FIG. 4 is an elevational view of the blind as positioned for use.

FIG. 5 is a top view of the blind of FIG. 4 with the blind being shown in solid outline and showing alternate positions of the end portions of the blind in dotted outline.

FIG. 6 is a top plan view showing how the blind can be folded for compactness.

DETAILED DESCRIPTION OF THE PREFERRED EMBODIMENTS

Figure 1:
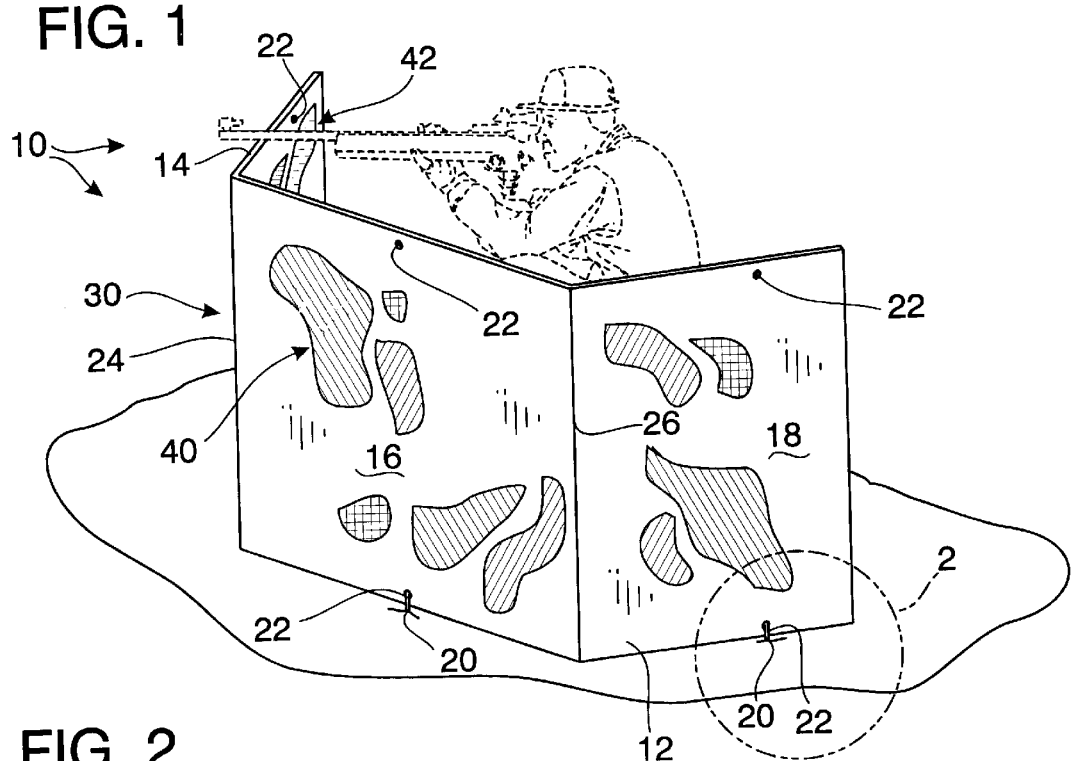
FIG. 1 is a perspective view of one embodiment of present invention showing one way the invention can bee used. A hunter is illustrated in dotted outline.
Figure 3:
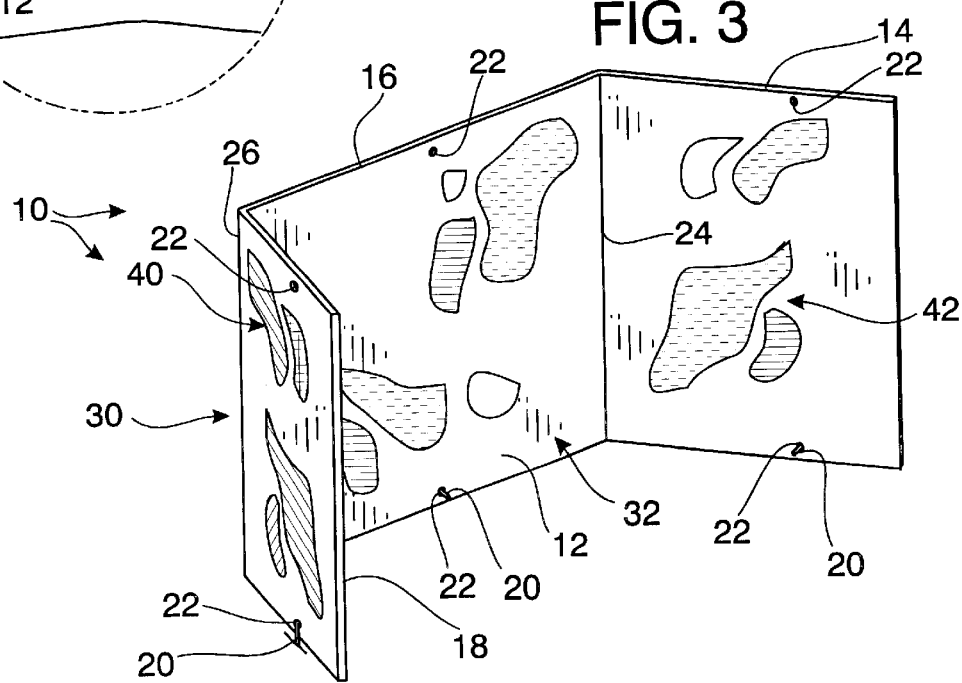
FIG. 3 is a perspective view of the blind of FIG. 1 showing a back side of the blind and illustrating how the same blind may incorporate different camouflaging patterns on the forward and rearward surfaces.

Referring now to FIGS. 1 and 3, a portable hunting blind 10 has a first side 30 and a second side 32. Associated with first side 30 is a first, camouflaged pattern 40. Associated with second side 32 is a second camouflaged pattern 42. Both first camouflaged pattern 40 and second camouflaged pattern 42 are adapted to blend into the background of a particular environment, such as woodlands, brush, prairies, swamps, and the like during one of the four seasons of the year. First camouflage pattern 40 and second camouflage pattern 42 represent different environmental backgrounds and/or seasons of the year.

Hunting blind 10 is made from a biodegradable material, such as cardboard. This allows for a lightweight disposable hunting blind which does not damage the environment.

Blind 10 is divided into three adjacent panels—that is, a first outer panel 14, a middle panel 16 and a second outer panel 18. First outer panel 14 and second outer panel 18 are pivotally connected to middle panel 16. While the panel portions can be separate and connected with a connection means, the preferred embodiment of the invention as illustrated, is a single continuous piece of biodegradable material with outermost portions 14 and 18 being bent, by means of creases 24 and 26, thereby creating the three panels mentioned above.

The representation of three adjacent panels is a preferred embodiment. It is within the scope of the present invention to incorporate a design having more than three panels.

Figure 2:
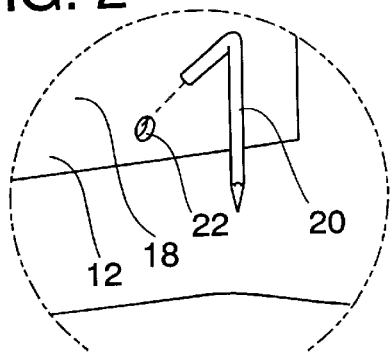
FIG. 2 is an enlarged fragmentary portion of a lower edge of the blind showing how securing means can be employed to retain the blind in position on the earth's surface.

As illustrated in FIG. 2, a securing means 20 may be formed of a length of stiff wire that is bent so that a long portion, having a tapered end can be pushed into the ground and a bent portion can extend through an opening 22 as formed in the blind in a longitudinal edge portion 12. Openings 22 may as illustrated, be formed along both upper and lower longitudinal edge portions of the blind so that the blind can be used by inverting it. In this manner if one longitudinal edge portion becomes weak, such as by the absorption of moisture, the blind can be inverted for longer useful life. Further, by being able to invert the blind the most desirable match of the camouflage to suit the background may be achieved.

The blind can be constructed of one large piece of material, such as cardboard, with two laterally extended creases 24 and 26. As illustrated in FIG. 5, creases 24 and 26 can be arranged to allow the outer panels 14 and 18 to be folded with respect to the middle panel 16.

FIG. 6 shows outer panels 14 and 18 folded to be contiguous to middle panel 16 to form the blind into a compact package so that a user can easily transport the blind into the field to be set up.

Whereas FIG. 2 shows a specifically configured metal securing means 20. This is by illustration only. Small diameter stakes could be extended at an angle through openings 22 to hold the blind in an upright position. If a user wishes, he or she can improvise by finding lengths of small diameter limbs or branches that can be cut by an axe or knife to function as the securing means. Thus the securing means or anchors 20 can either be especially configured and manufactured device as illustrated in FIG. 2 or can be improvised from readily available material found in nature.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A hunting blind comprising;
   a flat base panel having opposed first and second parallel edges;
   a first flat side panel secured to said first edge of said base panel; and
   a second flat side panel secured to said second edge of said base panel, said base and side panels being made of a single piece of lightweight biodegradable material, said first and second side panels being foldable to lie parallel to said base panel or to intermediate positions to lie at angles to said base panel, at least one surface of each of said panels having a camouflaged pattern thereon, said base and side panels each having a top and a bottom edge and wherein when said side panels are folded to said intermediate positions either said top edges or said bottom edges may be positioned on the earth's surface.

2. A hunting blind according to claim 1 wherein each of said base and side panels have opposed first and second surfaces and wherein all of the first surfaces are of a first camouflage design and all of the second surfaces are of a second camouflage design.

3. A hunting blind according to claim 1 including;
   anchors attachable to either of said top or bottom edges of said panels, the anchors being extendable into the earth's surface.

4. A hunting blind according to claim 1 wherein said base and side panels are formed of a single piece of cardboard with creases permitting said side panels to be folded relative to said base panel.

5. A hunting blind according to claim 1 wherein said panels are made of cardboard.

\* \* \* \* \*